July 28, 1959 — J. B. LONG ET AL — 2,896,774
BELT CONVEYORS
Filed Dec. 3, 1957 — 2 Sheets-Sheet 1

INVENTORS
John B. Long
Jeff C. Clay

BY Lancaster, Allwine & Rommel
ATTORNEYS

July 28, 1959  J. B. LONG ET AL  2,896,774
BELT CONVEYORS

Filed Dec. 3, 1957  2 Sheets-Sheet 2

INVENTORS
John B. Long
Jeff C. Clay

BY
ATTORNEY

United States Patent Office 2,896,774
Patented July 28, 1959

2,896,774

BELT CONVEYORS

John B. Long, Oak Hill, and Jeff C. Clay, Fayetteville, W. Va., assignors to The Long Company, Oak Hill, W. Va., a corporation of West Virginia Application December 3, 1957, Serial No. 700,444

5 Claims. (Cl. 198—202)

This invention relates to improvements in belt conveyors, and more particularly to improvements in belt conveyors in which the conveyor roller units of the load bearing stretch of the belt are supported upon spaced flexible strands of wire or rope.

In the provision of belt conveyors for transporting material of varied sizes for a substantial distance, wherein it is necessary to provide a conveyor that can quickly and easily be longitudinally either extended or contracted, as for instance in the conveying of coal within a coal mine, it has become increasingly apparent that a belt conveyor supported upon spaced flexible strands of wire or rope is being accepted as the most economical method for quick and economical conveying. In the transition, from rigidly supported belt conveyors to flexibly supported belt conveyors, the position of the belt and its supports have been changed from one wherein the belt is positioned above its side supports to one wherein the belt is suspended below the flexible strands of rope or wire that function as side supports for the belt.

The primary object of this invention is the provision of a belt conveyor in which the conveying roller units of the load bearing stretch of the belt are supported upon spaced flexible strands of wire or rope mounted upon floor supported standards, wherein the load bearing stretch of the belt is positioned above the spaced flexible strands of wire or rope and standards. One of the advantages of so positioning the belt, above the spaced flexible strands and also above the standards supporting the flexible strands, is that the conveying system is made more efficient, as the objects being conveyed will not be knocked off the belt by hitting either the flexible strands or the standards supporting the flexible strands, even when the objects being transported protrude over the sides of the belt. It is well known that personnel occasionally ride on these belts, getting onto and off of the belt while it is in motion. The positioning of the belt above the flexible strands and also above the standards supporting the flexible strand decreases the operational hazard. Heretofore belt conveyors have been provided in which the flexible strands extend and the standard project in zones above the load bearing reach of the conveyor belt and that arrangement presents a hazard in that a person attempting to get onto or off the moving belt may contact the strands or hit the standards, with resulting injury.

A further object is the provision of a belt conveyor in which flexible strands of wire or rope are used, wherein conveying belt supporting roller units are provided that will incline from the vertical in the direction of travel of the belt, thereby making the belt self-training. While the principle of inclining the belt supporting roller units is old in the art where rigid supports for the units have been provided, the same has heretofore been impractical in flexible supported belt conveyors. In the present art, with respect to belt conveying systems using flexible strands of wire or rope, the conveying rollers are underslung below the flexible strands and any pressure or load upon the belt forces the lowermost portion of the rollers forward and upward in a swinging motion about the pivotal axis of the rollers connection to the strands, causing the rollers to rotate in a forward and outward direction, so that if the belt passing across the rollers starts to slide outward toward one side of the rollers such outward impetus will be encouraged by the rotation of the rollers and misalignment of the belt becomes a serious problem. With our improved construction the application of a load to the belt causes the conveying roller units to rock and tilt forward in the direction of travel of the belt, but as the pivotal axis of the units, about the strands, is below the units, the rollers will cant downward and rotate in a forward and inward direction, so that if the belt passing across the rollers starts to slide outward toward one side of the rollers the inward rotational effect of the rollers will stop the outward movement and force the belt back down to its normal operating position, thus self-training the belt and overcoming the problem of misalignment.

A further object is the provision of a belt conveyor using the aforesaid flexible strands of wire or rope, wherein conveying roller units are provided rigidly spaced transversely of the belt, reducing spillage by providing a deep trough with a fixed depth and permitting wider spacing between the conveying units, thus providing a belt conveyor having transverse rigidity and laterally flexibility.

A further object is the provision of a belt conveyor, using flexible strands of wire or rope, wherein the standards supporting the flexible strands are adjustable in height, permitting belt leveling over an undulating floor and height adjustment for low and high ceiling mines, and wherein the strands may be run very close to the floor, increasing the stability of the conveying system and permitting its application in low ceiling places, such as in shallow seam mining.

A further object is the provision of a conveying roller unit having overlapping rollers that eliminate the possibility of the belt being caught between the rollers, and the possibility of belt edge contact with the inside end of the troughing rolls.

A further object is the provision of standards for supporting the flexible strands of wire or rope of strand supported belt conveyors, each standard having a substantially broad foot at one side and a substantially narrow foot at the other side so that the standard can be slipped under a low belt by turning the standard on its side and sliding the narrow foot thereunder and yet which will have stability and resistance to rocking when in an upright position by virtue of the floor contacting area of the broad foot.

A further object is the provision of standards for supporting the flexible strands of wire or rope of strand supported belt conveyors, each standard having a belt supporting return roller off center of the standard, in the direction of travel of the belt, so that any force exerted by the belt on the return roller will tend to maintain the standard in an upright position, counteracting the pull of the conveying rollers supported upon the strands, thereby maintaining its standard in a vertical upright position and avoiding undue rocking of the standard.

Other objects and advantages of the invention will be apparent during the course of the following detailed description, taken in connection with the accompanying drawings, forming a portion of this specification and in which drawings.

Figure 1:
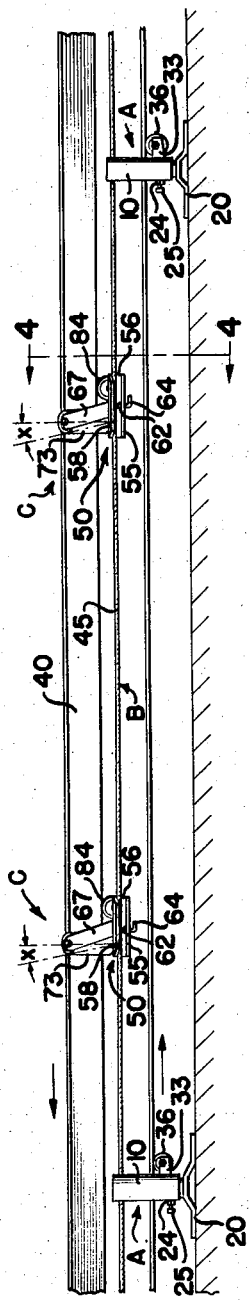
Fig. 1 is a side view of a length of a belt conveyor constructed according to our invention.

In the drawings, wherein for the purpose of illustration is shown a preferred form of the invention, and wherein similar reference characters designate corresponding parts throughout the several views, the letter A designates generally a standard; B spaced flexible strands or cables of wire or rope, mounted upon the standards A; and C conveying roller units or idler assemblies mounted upon the flexible strands or cables B.

Figure 2:
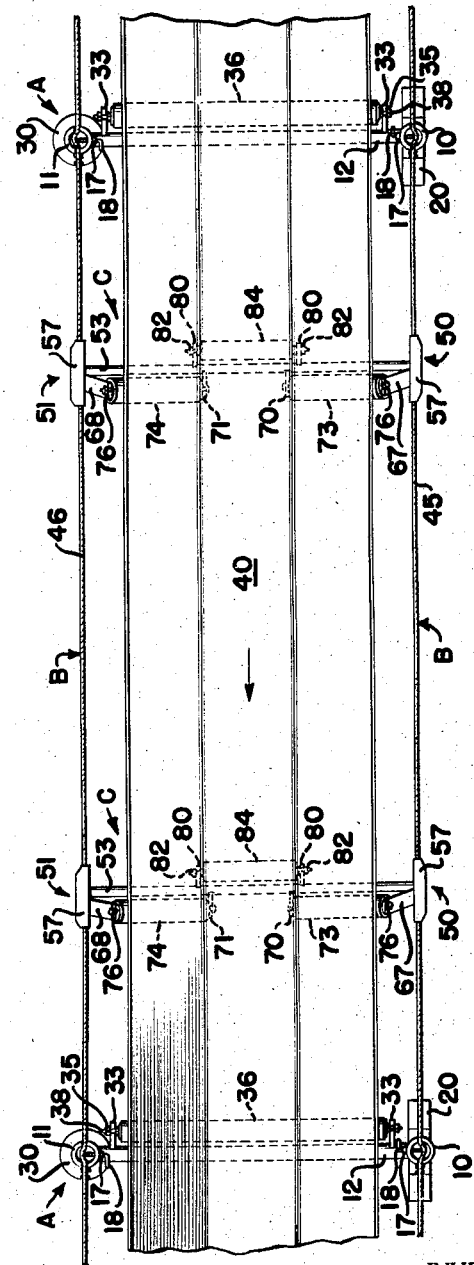
Fig. 2 is a top plan view of the length of a belt conveyor shown in Fig. 1.

The standard A preferably comprises a pair of upright tubular side members 10 and 11 secured together in spaced relation by a crossbar 12. The side members 10 and 11 are preferably relatively short lengths of cylindrical, hollow pipe, defining a chamber 13 therein. Although these members 10 and 11 may be of any desired shape it has been found most economical to use relatively short lengths of pipe. Each of these side members 10 and 11 is provided with diametrically opposed cutaway portions 15 open to its uppermost edge, providing a recess within which the flexible strands or cables B may fit. Each of the side members 10 and 11 is likewise provided with a threaded boss 17, at its uppermost side edge, through which a threaded locking member 18 is inserted and tightened against that length of the flexible strands or cables B projecting within the side members, for the purpose of securely holding the flexible strand or cables B in position within the respective side member 10 or 11. As the strands or cables will be held in position by relatively light pressure of the locking members 18 against the cables B, it will be seen, from Fig. 2, that by further tightening of the locking members 18 against the cables B, the tension of the cables can thereby be adjusted.

The side member 10 is preferably provided with an elongated base 20, secured to a cylindrical column member 22 that is telescopically received within the chamber 13 of the side member 10. A screw threaded boss 24 and set screw 25 may be provided at one side of the side member 10 for securing the member 22 in a fixed position within the side member 10.

The side member 11 is preferably provided with a cylindrical base 30, secured to a cylindrical column member 32 that is telescopically received within the chamber 13 of the side member 11. A threaded boss 24 and a set screw 25 may likewise be provided at one side of the side member 11 for securing the member 32 in place within the side member 11.

By loosening the set screws 25 it will be seen that the base portions 20 and 30 may be slidably extended from or contracted toward the side members 10 and 11 and that the height of the flexible strands or cables B, above the ground, may thereby be adjusted.

Secured to the cross bar 12, adjacent the side members 10 and 11 respectively are return roller mounting struts or brackets 33 which receive the hexagonal bearing structures 35 of the return roller 36. Grease fittings 38 may be provided outwardly of the bearing structures 35 for facile lubrication of the bearings. The elongated return roller 36 is of a length sufficient to support the return stretch of a belt 40. The brackets 33 are preferably mounted to one side of the crossbar 12, and the standard A, when in operating position, is preferably situated so that the return roller 36 will be on the side of the standard A in the direction of the travel of the return stretch of the belt.

The length of the crossbar 12 will of course determine the spacing of the side members 10 and 11 which will in turn determine the spacing of the flexible strands or cables B. We have found that an optimum spacing of the flexible strands or cables is 39 inches for a 30 inch belt and 45 inches for a 36 inch belt.

In the drawings we have shown the flexible strands or cables B as being a pair of parallel cables 45 and 46, the cable 45 being supported by the side members 10 and the cable 46 being supported by the side members 11. These cables, 45 and 46, parallel each other for a distance slightly greater than the length of the load bearing stretch of the belt 40 that it is desired to utilize. While we have not shown the mounting of the terminus of these cables 45 and 46, it is well known in the art that such cables are secured, at their terminus, to an eye which is firmly secured in place such as to the ground, or to some other rigid support.

Figure 4:
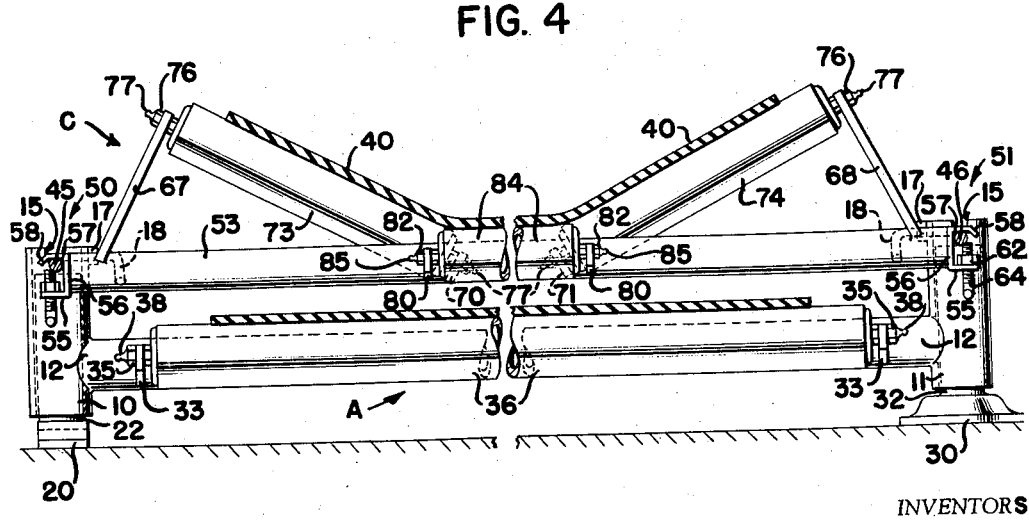
Fig. 4 is a fragmentary sectional view taken substantially on the line 4—4 of Fig. 1.

The conveying roller units or idler assemblies C preferably include cable receiving side brackets 50 and 51 secured together by a crossbar 53. The cable receiving brackets 50 and 51 are each in the shape of a somewhat flattened C, having an elongated lowermost portion 55, an upright side or bight portion 56 and an upper portion 57. The upper portion 57 is provided, at its outermost side edge, with a downturned lip 58 which aids in holding the brackets on the cable. The cables 45 and 46 are each received within the chamber 60 formed by the members 55, 56, 57, and 58, of its respective cable receiving bracket, with the uppermost portion 57 resting upon the top of the cable. A threaded boss 62 may be provided inwardly of the lowermost portion 55 which receives a threaded locking member 64 for securely locking the bracket in place upon its respective cables 45 or 46, as the case may be, as will be seen from Fig. 4. As the brackets 50 and 51 are to be supported in a fixed transverse relationship with respect to the strands or cables 45 and 46, it will be seen that the cross bar 53 should be of such length as to provide a rigid transverse connection between the brackets 50 and 51.

Secured to the crossbar 53, adjacent the brackets 50 and 51, are a pair of arms 67 and 68. As will be seen from Fig. 3, these arms 67 and 68 project in an angular direction both upwardly from and to one side of the crossbars 53. Angular brackets or struts 70 and 71, parallel to the arms 67 and 68, are secured to the crossbar 53, inwardly of the arms 67 and 68. The arm 67 and strut 70 support one side roller 73, and the arm 68 and strut 71 support another side roller 74. The side or troughing rollers 73 and 74 are provided with hexagonal end bearings structures 76 which are received within the hexagonal openings provided in the arms and strut. Lubricating fittings 77 may extend outwardly from the bearing structures, beyond the arms and struts for the facile lubrication of the bearings of the rollers.

Secured centrally of the crossbar 53, spaced outwardly from the struts 70 and 71 and projecting from the opposite side of the crossbar 53 from the struts 70 and 71, are central roller supporting struts or brackets 80. These struts 80 support hexagonal bearing structures 82 which in turn support the central roller 84. A lubricant fitting 85 may extend from the bearing structures, beyond the struts 80, for facile lubrication of the bearing structures 82.

By providing the struts 70 and 71 spaced inwardly of the struts 80, we have so positioned the side rollers 73 and 74 and the central roller 84 so that the side rollers overlap a portion of the central roller and the possibility of the belt becoming caught between the side rollers and the central roller and the possibility of the belt edge contact with the inside edge of the side rollers has been overcome. When the rollers 73 and 74 are angularly supported above the crossbar 53, divergent toward the center thereof, and to one side of the crossbar 53, in the manner shown and described, a transversely rigid trough design is provided that forms a consistently deep trough for the load bearing stretch of belt, reducing spillage of the conveyed material from the belt and permitting wider spacing between the conveying roller units C.

Thus the conveying roller units or idler assemblies C are supported in zones above the zones of the uppermost surface of the flexible strands or cables 45 and 46 and above the zones of the standards A, so that the belt 40, which is entrained over the side rollers 73 and 74 and the central roller 84, will have the upper surface thereof above the cables and standards and so that any personnel or any material riding upon the belt 40 will not come in contact with any of the belt supporting assembly.

The entire assembly is constructed so that upon complete telescoping of the cylindrical column members 22 and 32 within the side members 10 and 11 respectively, of the standard A, the overall height can be reduced to a minimum of 14¼ inches, which is of a convenient minimum height for operation in low ceiling coal mines.

Although the specific diameter of the rollers and the angular relationship of the side rollers 73 and 74, with respect to the crossbar 53, is relatively unimportant we have discovered that if we use rollers having a diameter of 2½ inches and dispose the side rollers 73 and 74 at an angle of 26 degrees, 33 minutes with respect to the crossbar 53, that optimum results are achieved.

The side rollers 73 and 74 are preferably disposed on the side of the crossbar 53 in the direction of travel of the load bearing stretch of the belt 40, as shown in Fig. 1. As the belt travels over the side rollers 73 and 74 there will be a tendency for the entire conveying roller units C to rock forward, flexing cables 45 and 46, canting the conveying roller units forwardly in the direction of travel of the load bearing stretch of the belt 40, as shown by the distances X in Figs. 1 and 3. The angular canting of the conveying roller units C has been slightly exaggerated in Figs. 1 and 3, for illustrative purposes, and such angular disposition will depend upon and vary with the centering of the load, the load itself, belt speed, rope tension, and the length of the arms 67 and 68.

Figure 3:
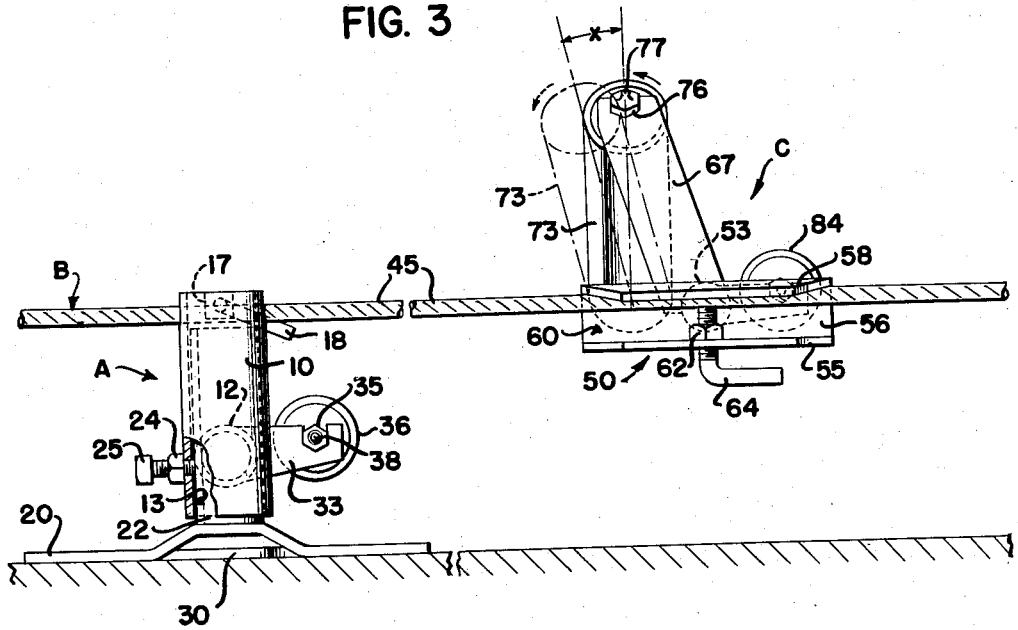
Fig. 3 is an enlarged fragmentary view of the standard and conveying roller unit of our invention.

When the belt is under a normal centered load the conveying roller units C will have an axis of rotation substantially normal to the line of travel of the belt and a direction of rotation coincident with the line of travel of the belt, as shown in solid lines in Fig. 3. When an off center or other than normal load is applied that tends to misalign the belt and passes over a conveying roller unit, pressure will be exerted on the upper ends of the rollers 73 and 74 and the conveying unit will be inclined forwardly, canting the outer ends of the rollers 73 and 74 a greater distance than the inner ends thereof, inclining the axis of rotation of these rollers so that the direction of rotation thereof is angularly toward the central portion of the belt and angularly disposed in the direction of the line of travel of the belt, as shown in dot and dash lines in Fig. 3. This forwardly inclined position of the axis of the rollers is due to the fact that the arms 67 and 68, supporting the outer end of each of the rollers, are longer than the struts 70 and 71, supporting the inner end of each of the rollers, and will move in a greater arc upon turning of the cross bar 53, which will cant the rollers so that the axis thereof is no longer normal to the line of travel of the belt. When the side rollers 73 and 74 are thus canted it will be seen that if the belt 40 tends to ride up upon either one of the rollers 73 or 74 that the angular direction of rotation of the rollers will force the belt back into a central position, so that the belt becomes self-training by the angular displacement of the rollers 73 and 74.

The return roller 36 of each standard A is mounted upon the cross bar 12, to the side in the direction of the return travel of the belt 40, so that as the belt 40 travels along the rollers 36 of the various standards A, the motion of the belt will tend to counteract the pulling of the cables 45 and 46 by the angular displacement of the conveying roller units C so that the standards A will remain vertically upright upon the mine floor.

In the drawings we have shown a pair of conveying roller units C as being mounted between each pair of standards A, however it is to be understood that one or more conveying roller units may be mounted between the standards A, dependent upon conveying conditions, such as load, spacing of the standards A, etc.

It will be seen that we have thus provided a belt conveyor wherein the uppermost surface of the belt is above its supporting assembly and one wherein the conveying units are secured rigidly transversely of the flexible strands or cables 45 and 46 and yet wherein the conveying units are flexible longitudinally of the cables or strands 45 and 46 so that the conveying units C will maintain proper spreading of the belt 40 and yet may also flex the cables 45 and 46 in a longitudinal direction, so that the conveying units C assume an angular relationship with respect to the cables 45 and 46, thereby making the stretch of the belt 40, which passes over the conveying units C, self-training.

The belt may be rotated by any conventional driving arrangement well known in the art.

Various changes may be made to the form of the invention herein shown and described without departing from the spirit of the invention or the scope of the following claims.

We claim:

1. In a conveyor of the endless belt type, the combination of a plurality of standards; a pair of substantially parallel, flexible strands supported by said standards; a plurality of conveying units; and bracket means supporting said conveying units upon said strands for canting in accordance with the flexure of said strands; said conveying units each including a rigid cross brace having one of said bracket means secured to each end thereof, said cross brace extending crosswise between said strands and supporting said bracket means in juxtaposition for attachment to said strands, a pair of side rollers and a central roller, a pair of arms secured to said cross brace, said arms supporting said central rollers substantially centrally of and substantially parallel to said cross brace with the entire belt contacting periphery of said central roller disposed above said strands and having a direction of rotation coincident with the line of travel of said endless belt, a pair of arms supporting each of said side rollers upon said cross brace and to each side of said central roller, the outermost of said arms supporting said side rollers being longer than the inner arms thereof, said outermost arms being upwardly inclined toward said central roller so that the outermost point of support of said side rollers is inwardly toward the central roller from the point of support of said outermost arms upon said cross brace, said outermost arms thereby supporting said side rollers angularly outwardly divergent from said cross brace with the entire belt contacting periphery of said side rollers disposed above said strands, said cross brace forming a pivot axis for said arms supporting said rollers; said bracket means having a strand overlying portion of sufficient length longitudinally of said strands to support said cross brace upon said strands with the entire belt contacting periphery of said rollers above said strands and with the axis of rotation of said rollers substantially normal to the line of travel of the belt when the belt is aligned and under a normal centered load, said bracket means forming a pivot for the pivoting of said cross brace when the belt is under an off-center or other than normal load that exerts a misaligning force on the belt, the forward moving pressure of the belt when the same is under an offcenter or other than normal load that exerts a misaligning force on the belt causing the belt to bear hard against the belt contacting periphery of said side rollers and transmitting a pivoting force to said cross brace through the greater length of the outermost arms supporting said side rollers, said cross brace pivoting and canting said conveying units in proportion to the moving off-center or other than normal pressure of the load on the endless belt, said pivoting action being permitted by the mounting of said bracket means upon said flexible strands and the coacting flexure of said flexible strands, said canting inclining the upper ends of said side rollers forwardly a greater distance than the inner ends thereof and inclining the axis of rotation of said side rollers so that the direction of rotation thereof is angularly toward the central portion of said endless belt and angularly disposed in the direction of the movement of the belt in proportion to the off center or other than normal load and speed of movement of the belt, said canting thereby orienting and training the belt with respect to said conveying unit.

2. The combination as specified in claim 1 wherein said strand overlaying portion of said bracket means is fixedly secured to said strand by a single point locking means, said single point locking means being disposed substantially centrally of the length of the strand overlaying portion, so that substantially the entire length of said strand overlaying portion supports said conveying unit when the belt supported thereby is under a normal centered load substantially one-half of the length of said strand overlaying portion bears against said flexible strand as said conveying unit is canted, thereby governing and providing optimum resistance to flexure of the flexible strands and controlling the pivotal movement of said cross brace and providing a support for said conveying units having sufficient stabilizing contact with said flexible strands to maintain the belt contacting structure of said conveying units above said flexible strands and yet eliminating the necessity for overcoming the entire pivot resisting contact of said bracket means with said strands as the canting of said conveying units is effected.

3. In a conveyor of the endless belt type, the combination of a plurality of standards; a pair of substantially parallel, flexible strands supported by said standards; a plurality of conveying units; and bracket means supporting said conveying units upon said strands for canting in accordance with the flexure of said strands; said conveying units each including a rigid cross brace having one of said bracket means secured to each end thereof, said cross brace extending crosswise between said strand and supporting said bracket means in juxtaposition for attachment to said strands, a pair of side rollers and a central roller, a pair of arms secured to said cross brace, said arms supporting said central roller substantially centrally of and substantially paralled to said cross brace with the entire belt contacting periphery of said central roller disposed above said strands and having a direction of rotation coincident with the line of travel of said endless belt, a pair of arms supporting each of said side rollers upon said cross brace and to each side of said central roller, the outermost of said arms supporting said side rollers being longer than the inner arms thereof and supporting said side rollers angularly outwardly divergent from said cross brace with the entire belt contacting periphery of said side rollers disposed above said strands; said bracket means having a strand overlaying portion of sufficient length longitudinally of said strands to support said conveying units upon said strands with the entire belt contacting periphery of said rollers above said strands and with the axis of rotation of said rollers substantially normal to the line of travel of the belt when the belt is under a normal centered load, said bracket means forming a pivotal axis for the pivoting of said conveying unit when the belt is under an off center or other than normal load that exerts a misaligning force on the belt, the forward moving pressure of the belt when the same is under an off center or other than normal load causing the belt to bear hard against the belt contacting periphery of said side rollers and transmitting a pivotal force to said conveying unit through the greater length of the outermost arms supporting said side rollers, said conveying units pivoting and becoming canted in proportion to the moving pressure of the endless belt and canting in the direction of movement of the endless belt, said pivoting action being permitted by the mounting of said bracket means upon said flexible strands and the flexure of said flexible strands, said canting of said conveying units inclining the upper ends of said side rollers forwardly a greater distance than the inner ends thereof and inclining the axis of rotation of said side rollers so that the direction of rotation thereof is angularly toward the central portion of said endless belt and angularly disposed in the direction of the movement of the belt in proportion to the load and speed of movement of the belt, said canting thereby orienting and training the belt with respect to said conveying unit.

4. The combination as specified in claim 3 wherein each of said bracket means includes an elongated upper portion having a length substantially equal to the longitudinal width of the conveying unit secured thereby, said upper portion of said bracket means being positioned upon and engaging the uppermost surface of a flexible strand and providing a substantially elongated base extending longitudinally of the flexible strand for supporting the conveying unit upon the flexible strand so that the conveying unit will have a negligible canting movement when the belt supported by the conveying unit is under a normal centered load and a locking member secured to said bracket means substantially centrally of the length thereof, said locking member having substantially point to point contact with the lowermost surface of a flexible strand and holding the flexible strand in abutment with said upper portion of said bracket means, said point to point contact of said locking member and a flexible strand forming a pivot axis for pivoting of said conveying unit about which said conveying unit secured thereby cants when the belt supported by the conveying unit is under an off center or other than normal load.

5. In a conveyor of the endless belt type, the combination of a plurality of standards; a pair of substantially parallel, flexible strands supported by said stardards; a plurality of conveying units; and bracket means supporting said conveying units upon said strands for canting in accordance with the flexure of said strands; said conveying units each including a rigid cross brace having one of said bracket means mounted adjacent each end thereof, said cross brace extending crosswise between said strands and supporting said bracket means in juxtaposition for attachment to said strands, a pair of side rollers and a central roller mounted upon said cross brace, said central roller being mounted substantially centrally of said cross brace with the entire belt contacting periphery of said central roller disposed above said strands and having a direction of rotation coincident with the line of travel of said endless belt, said side rollers being mounted upon said cross brace to each side of said central roller with the axis thereof angularly upwardly divergent from the axis of said central roller and with the entire belt contacting periphery of said side rollers disposed above said strands; said bracket means having a strand overlaying portion of sufficient length longitudinally of said strands to support said conveying units upon said strands with the entire belt contacting periphery of said rollers above said strands with the axis of rotation of said rollers substantially normal to the line of travel of the belt when the belt is under normal load and coacting with said flexible strands and controlling the pivotal movement of said conveying unit with respect to said flexible strands, said bracket means forming a pivotal axis for the pivoting of said conveying unit when the belt is under an off center or other than normal load that exerts a misaligning force on the belt, the ends of said side rollers outwardly from said central roller being further removed from the pivotal axis of said conveying unit formed by said bracket means than the inner ends thereof, the forward moving pressure of the belt when the same is under an off center or other than normal load that exerts a misaligning force on the belt causing the belt to bear hard against the belt contacting periphery of said side rollers and transmitting a pivotal force to said conveying unit through the leverage provided by said ends of said side rollers outwardly from said central roller being further removed from the pivotal axis of said conveying unit formed by said bracket means than the inner ends thereof, said conveying units pivoting and becoming canted in proportion to the moving pressure of the endless belt and canting in the direction of movement of the endless belt, said pivoting action being permitted by the mounting of said bracket means upon said flexible strands and the coacting flexure of said flexible strands, said canting of said conveying units inclining the upper ends of said rollers a greater distance than the inner ends thereof and inclining the axis of rotation of said side rollers so that the direction of rotation thereof is angularly toward the central portion of said endless belt and angularly disposed in the direction of the movement of the belt in proportion to the load and speed of the movement of the belt, said canting thereby orienting and training the belt with respect to said conveying unit.

References Cited in the file of this patent

UNITED STATES PATENTS

| | | |
|---|---|---|
| 1,651,253 | Clifford | Nov. 29, 1927 |
| 1,748,301 | McKinlay | Feb. 25, 1930 |
| 1,973,095 | Muller | Sept. 11, 1934 |
| 2,195,159 | Wood | Mar. 26, 1940 |
| 2,261,088 | Kendall | Oct. 28, 1941 |
| 2,437,499 | Benjamin | Mar. 9, 1948 |
| 2,514,715 | Milik | July 11, 1950 |
| 2,773,257 | Craggs et al. | Dec. 4, 1956 |
| 2,851,151 | McCallum | Sept. 9, 1958 |
| 2,875,886 | LoPresti et al. | Mar. 3, 1959 |